(12) United States Patent
Sawai et al.

(10) Patent No.: US 10,420,037 B2
(45) Date of Patent: Sep. 17, 2019

(54) COMMUNICATION CONTROL METHOD, COMMUNICATION SYSTEM, AND MANAGEMENT SERVER

(71) Applicant: SONY CORPORATION, Tokyo (JP)

(72) Inventors: Ryo Sawai, Tokyo (JP); Ryota Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/434,737

(22) Filed: Feb. 16, 2017

(65) Prior Publication Data

US 2017/0230911 A1    Aug. 10, 2017

Related U.S. Application Data

(63) Continuation of application No. 13/580,986, filed as application No. PCT/JP2011/001507 on Mar. 15, 2011, now Pat. No. 9,609,603.

(30) Foreign Application Priority Data

Mar. 29, 2010  (JP) ................................. 2010-075336

(51) Int. Cl.
*H04W 52/24*  (2009.01)
*H04W 16/10*  (2009.01)
*H04W 52/34*  (2009.01)
*H04W 16/14*  (2009.01)
*H04W 52/26*  (2009.01)
(Continued)

(52) U.S. Cl.
CPC ......... *H04W 52/243* (2013.01); *H04W 16/10* (2013.01); *H04W 16/14* (2013.01); *H04W 52/245* (2013.01); *H04W 52/265* (2013.01); *H04W 52/343* (2013.01); *H04W 72/0453* (2013.01); *H04W 72/082* (2013.01)

(58) Field of Classification Search
None
See application file for complete search history.

(56) References Cited

U.S. PATENT DOCUMENTS 6,542,718 B1    4/2003  Kuo
2001/0053695 A1  12/2001  Wallentin
(Continued)

FOREIGN PATENT DOCUMENTS

JP    2008-252253 A    10/2008
JP    2009-159452 A     7/2009
(Continued)

OTHER PUBLICATIONS

Office Action dated Feb. 3, 2015 in Japanese Patent Application No. 2014-095742 (with English language translation).
(Continued)

*Primary Examiner* — Zhiyu Lu
(74) *Attorney, Agent, or Firm* — Xsensus LLP

(57) ABSTRACT

A management server in a network including a first transmitting device that communicates with a first receiving device and a second transmitting device that communicates with a second receiving device. The management server includes a network interface that receives a parameter corresponding to a level of improvement of communication quality at the second receiving device, and a processor that calculates an allowable interference amount at the first receiving device based on the parameter.

7 Claims, 7 Drawing Sheets

(51) Int. Cl.
*H04W 72/04* (2009.01)
*H04W 72/08* (2009.01)

(56) References Cited

U.S. PATENT DOCUMENTS

| | | |
|---|---|---|
| 2002/0093922 A1 | 7/2002 | Grilli |
| 2002/0105923 A1 | 8/2002 | Nikides et al. |
| 2003/0190926 A1 | 10/2003 | Harris et al. |
| 2006/0019665 A1* | 1/2006 | Aghvami ............ H04W 16/32 455/444 |
| 2007/0248035 A1* | 10/2007 | Sang ............ H04W 52/346 370/318 |
| 2007/0287464 A1 | 12/2007 | Hamamoto et al. |
| 2008/0112360 A1 | 5/2008 | Seidel |
| 2008/0112426 A1 | 5/2008 | Seidel |
| 2008/0112427 A1 | 5/2008 | Seidel |
| 2008/0112428 A1 | 5/2008 | Seidel |
| 2008/0113667 A1 | 5/2008 | Seidel |
| 2008/0146154 A1 | 6/2008 | Claussen et al. |
| 2008/0175185 A1 | 7/2008 | Ji et al. |
| 2009/0011770 A1 | 1/2009 | Jung |
| 2009/0042593 A1 | 2/2009 | Yavuz |
| 2009/0042594 A1* | 2/2009 | Yavuz ............ H04W 52/40 455/522 |
| 2009/0270109 A1 | 10/2009 | Wang Helmersson |
| 2009/0296627 A1 | 12/2009 | Lee |
| 2010/0120446 A1 | 5/2010 | Gaal |
| 2010/0261467 A1 | 10/2010 | Chou |
| 2011/0022714 A1 | 1/2011 | Nobukiyo |
| 2011/0039569 A1 | 2/2011 | Narasimha |

FOREIGN PATENT DOCUMENTS

| | | |
|---|---|---|
| JP | 2009-542043 A | 11/2009 |
| JP | 2010-536307 A | 11/2010 |
| WO | WO 2008/076219 A2 | 6/2008 |
| WO | WO 2009/023587 A2 | 2/2009 |
| WO | WO 2009/023596 A2 | 2/2009 |
| WO | WO 2009/131522 A1 | 10/2009 |

OTHER PUBLICATIONS

Extended European Search Report dated May 8, 2015 in Patent Application No. 11762167.2.
Chinese Office Action dated Jul. 18, 2014, in China Patent Application No. 201180015157.6 (with English translation).
International Search Report dated Apr. 19, 2011 in PCT/JP2011/001507.

* cited by examiner

[Fig. 1]
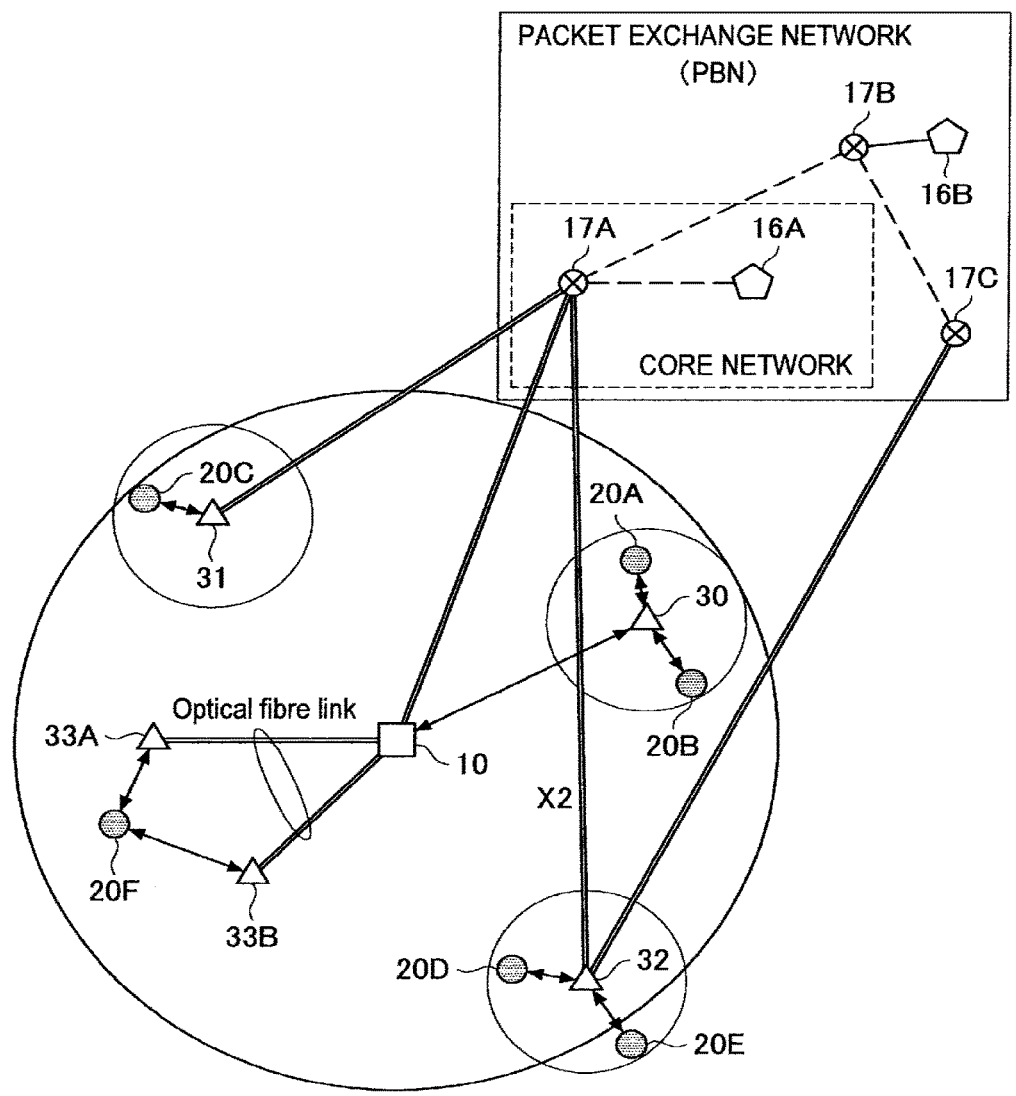

[Fig. 2]

| | IF WITH MACRO CELL BASE STATION | ACCESS | ASSUMED LOCATION |
|---|---|---|---|
| RRH CELL BASE STATION | OPTICAL FIBER | OPEN TO ALL USER EQUIPMENTS | OUTDOOR |
| HOTZONE BASE STATION | X2 | OPEN TO ALL USER EQUIPMENTS | OUTDOOR |
| FEMTOCELL BASE STATION | X2 TUNNELING PROTOCOL ON PBN | CLOSED GROUP | INDOOR |
| RELAY NODE (RELAY BASE STATION) | RADIO (SO-CALLED RELAY LINK) | OPEN TO ALL USER EQUIPMENTS | OUTDOOR |

[Fig. 3]
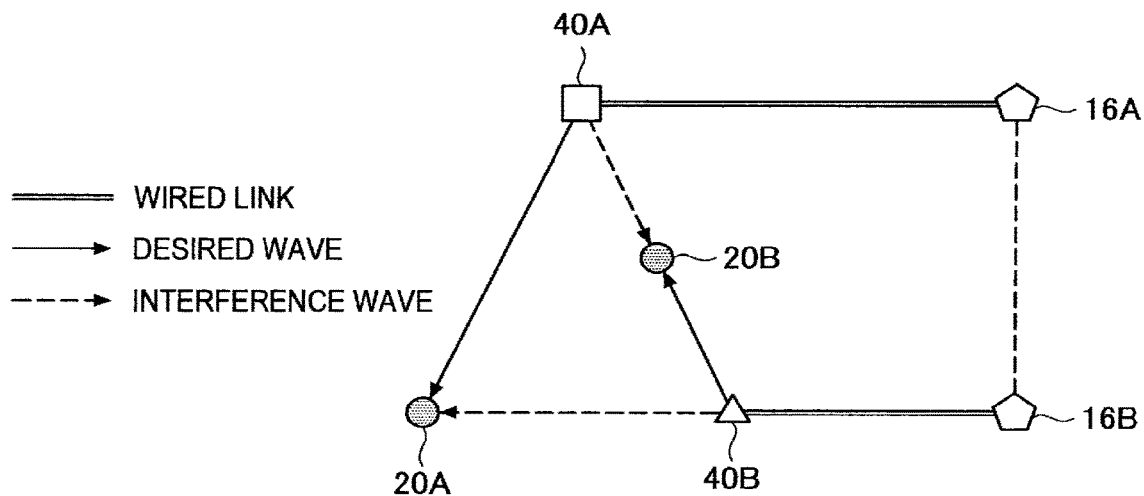

[Fig. 4]
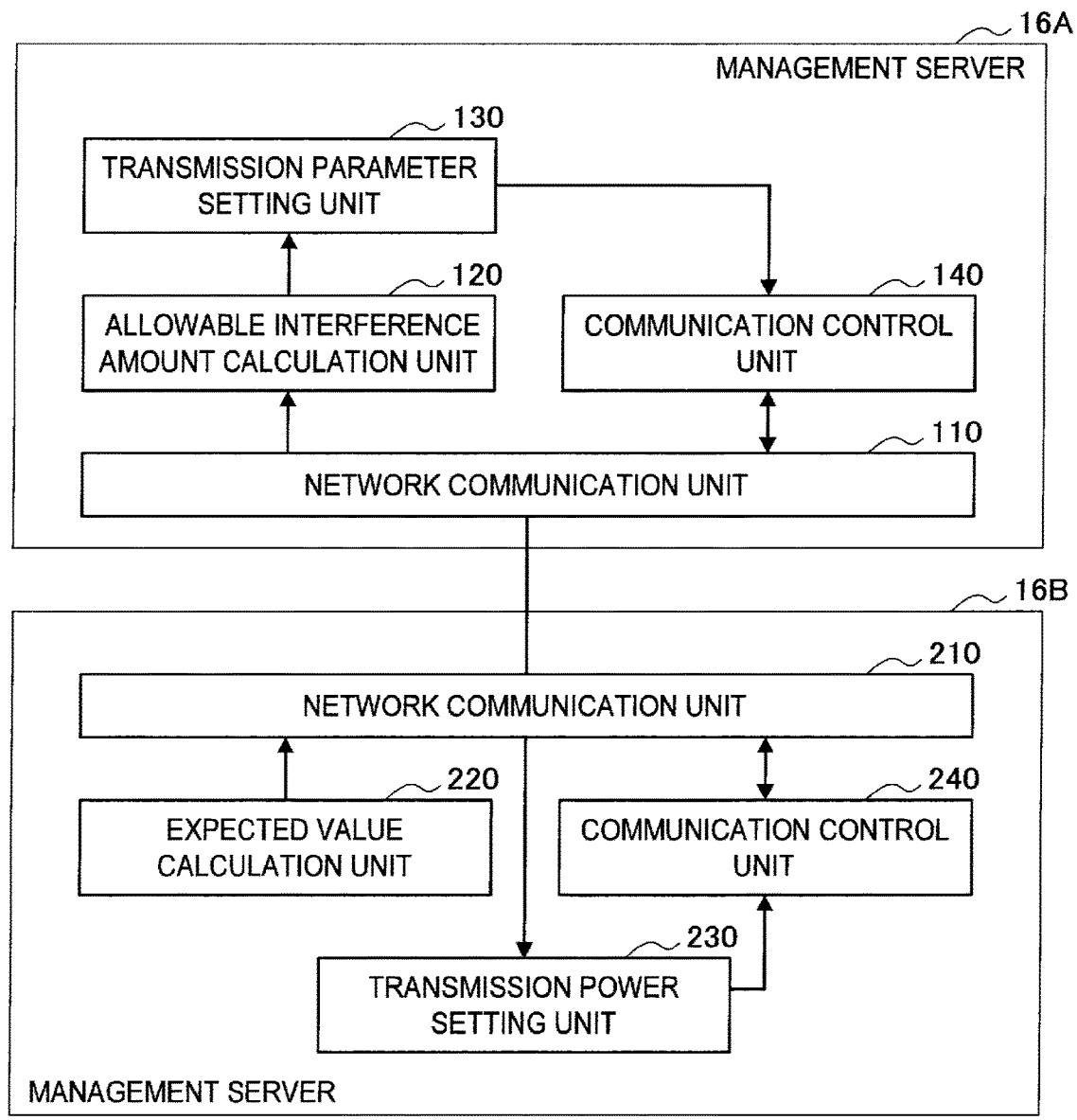

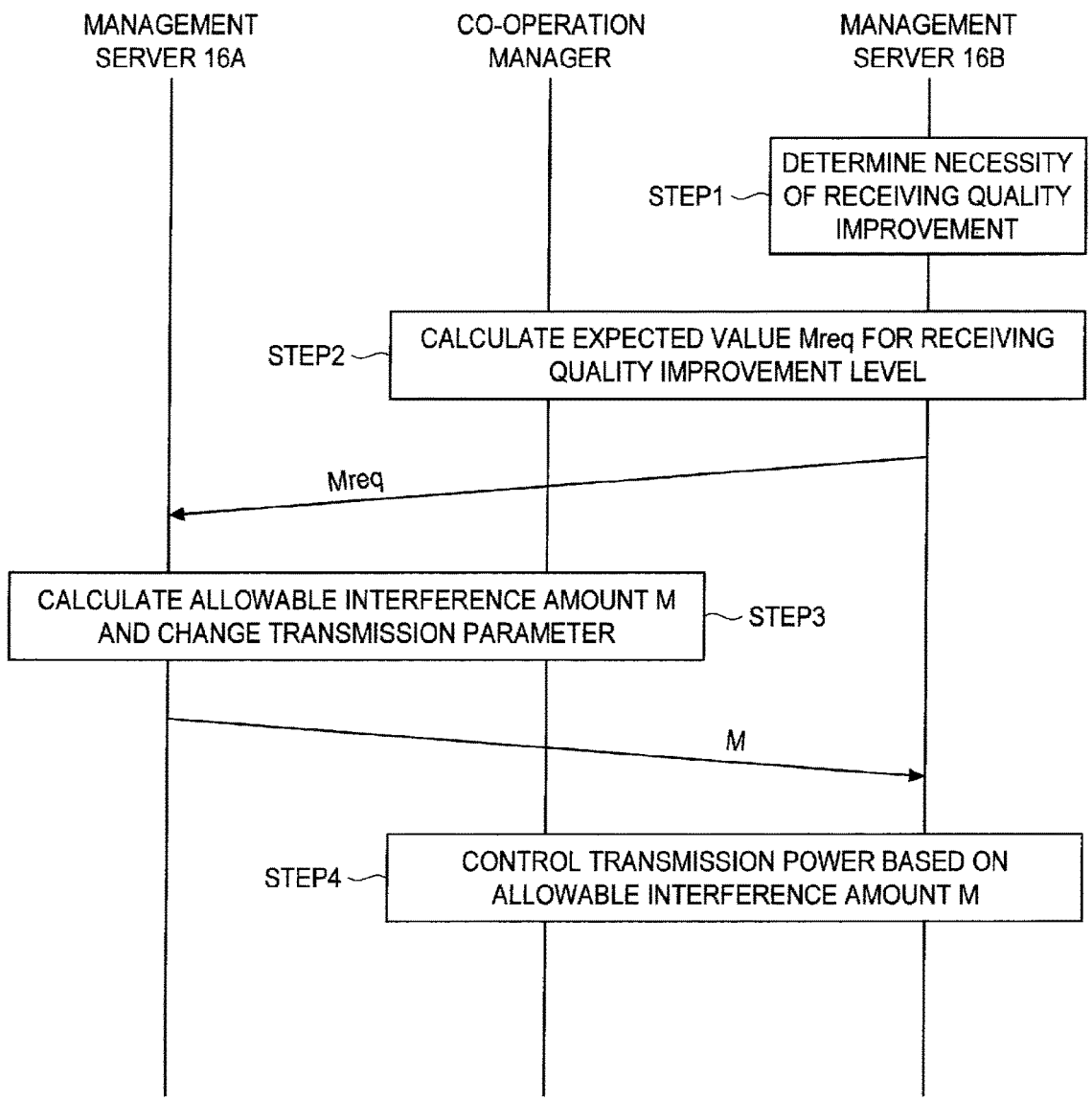
[Fig. 5]

[Fig. 6]
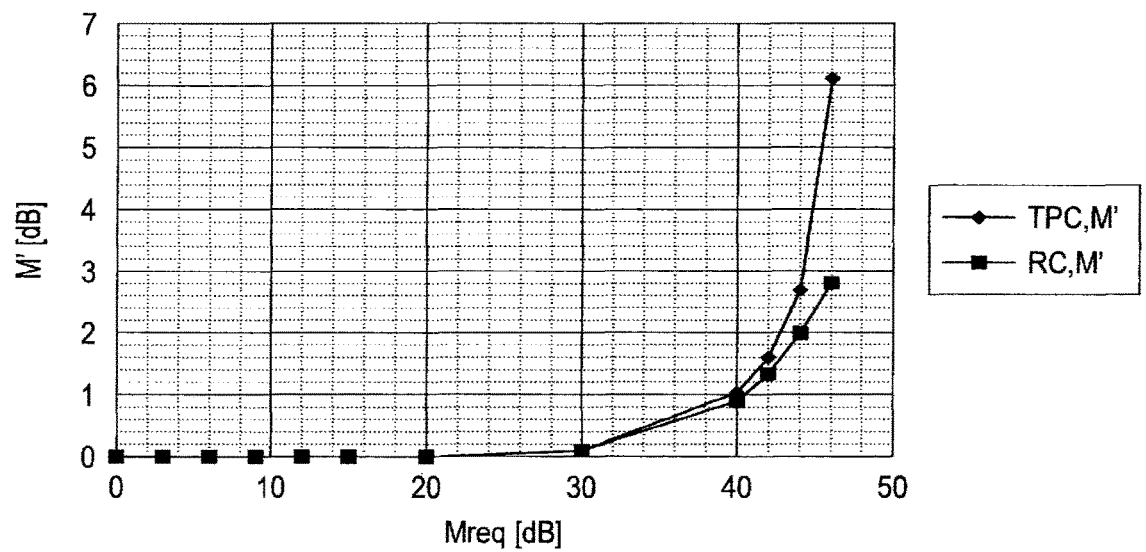
[Fig. 7]
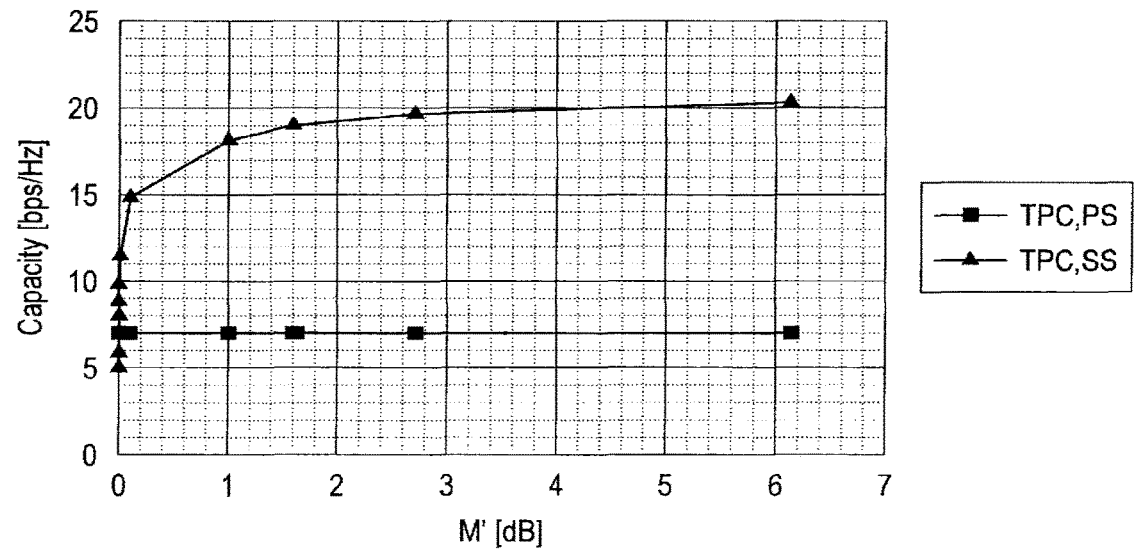

[Fig. 8]
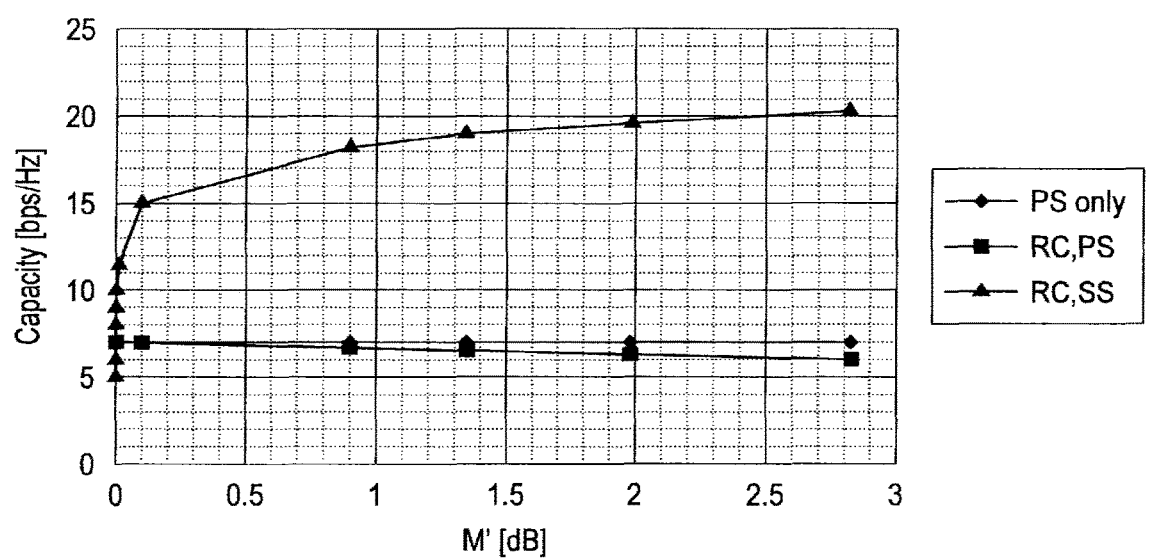

COMMUNICATION CONTROL METHOD, COMMUNICATION SYSTEM, AND MANAGEMENT SERVER

INCORPORATION BY REFERENCE

This application is a continuation of and claims the benefit of priority from U.S. application Ser. No. 13/580,986, filed Aug. 24, 2012, the entire contents of which are incorporated herein by reference. U.S. application Ser. No. 13/580,986 is a national stage of International Application No. PCT/JP11/001507, filed Mar. 15, 2011, which is based upon and claims the benefit of priority from Japanese Patent Application No. 2010-075336, filed Mar. 29. 2010.

TECHNICAL FIELD

The present invention relates to a communication control method, a communication system, and a management server.

BACKGROUND ART

In recent years, a heterogeneous network has been proposed as a next-generation communication network. The heterogeneous network is a network in which a plurality of kinds of small-to-medium-sized base stations coexist in a macro cell by performing underlay transmission or spectrum sharing. The small-to-medium-sized base stations involve a RRH (Remote RadioHead) cell base station, a hotzone base station (Pico/micro cell eNB), a femtocell base station (Home eNB), a relay node (relay base station) and the like.

In such a heterogeneous network, there is a concern that, when different base stations, such as a macro cell base station and a femtocell base station, for example, use the same frequency, improvement of an area capacity is hindered due to the occurrence of interference. Regarding such a concern, Patent Literature 1 and Patent Literature 2, for example, disclose techniques to overcome the interference issue between different transmitting devices.

CITATION LIST

Patent Literature

PTL 1: Japanese Patent Laid-open No. 2009-159452
PTL 2: Published Japanese Translation No. 2009-542043 of PCT International Publication

SUMMARY OF INVENTION

According to one exemplary embodiment, the disclosure is directed to a management server in a network including a first transmitting device configured to communicate with a first receiving device and a second transmitting device configured to communicate with a second receiving device, the management server comprising: a network interface configured to receive a parameter corresponding to a level of improvement of communication quality at the second receiving device; a processor configured to calculate an allowable interference amount at the first receiving device based on the parameter, wherein the network communication unit is configured to output the calculated allowable interference amount.

The second transmitting device and the second receiving device may communicate using a frequency that overlaps with a frequency used for communication between the first transmitting device and the first receiving device.

The network interface may be configured to receive management information indicating a state of a cell formed by the first transmitting device.

The processor may be configured to control communication in the cell formed by the first transmitting device based on the received management information.

The network communication unit may be configured to output the calculated allowable interference amount to a second management server that controls communications between the second transmitting device and the second receiving device.

The processor may be configured to calculate a maximum allowable interference amount based on the parameter, and the allowable interference amount may be calculated to be less than the maximum allowable interference amount.

The processor may be configured to set at least one of a transmitting power of the first transmitting device and a transmission rate of the first transmitting device based on the allowable interference amount.

The processor may be configured to calculate the allowable interference amount based on at least one or more of a reception power at the first receiving device, a reception power at the second receiving device, interference from the first transmitting device at the second receiving device, interference from the second transmitting device at the first transmitting device, a power of the first receiving device and a power of the second receiving device.

According to another exemplary embodiment, the disclosure is directed to management server in a network including a first transmitting device configured to communicate with a first receiving device and a second transmitting device configured to communicate with a second receiving device, the management server comprising: a processor configured to calculate a parameter corresponding to a level of improvement of communication quality at the second receiving device; a network interface configured to transmit the calculated parameter to a another management server, and receive an allowable interference amount at the first receiving device from the another management server, wherein the processor is configured to control communications between the second transmitting device and the second receiving device based on the allowable interference amount.

The second transmitting device and the second receiving device may communicate using a frequency that overlaps with a frequency used for communication between the first transmitting device and the first receiving device.

The network interface may be configured to receive management information indicating a state of a cell formed by the second transmitting device.

The processor may be configured to control communication in the cell formed by the second transmitting device based on the received management information.

The processor may be configured to determine whether to improve the receiving communication quality based on a comparison between a current communication quality and a desired communication quality.

The processor may be configured to calculate the parameter based on a relationship between the current communication quality and the desired communication quality.

The relationship between the current communication quality and the desired communication quality may be a ratio between the desired communication quality and the current communication quality.

The processor may be configured to control communications between the second transmitting device and the second receiving device so that an amount of interference caused by the second transmitting device at the first receiving device is less than the allowable interference amount.

According to another exemplary embodiment, the disclosure is directed to network comprising: a first management server configured to control communications between a first transmitting device and a first receiving device; a second management server configured to control communications between a second transmitting device and a second receiving device; a first processor, at the second management server, configured to calculate a parameter corresponding to a level of improvement of communication quality at the second receiving device; a first network interface, at the second management server, configured to transmit the calculated parameter to the first management server; a second processor, at the first management server, configured to calculate an allowable interference amount at the first receiving device based on the parameter; a second network interface, at the first management server, configured to transmit the calculated allowable interference amount to the second management server, wherein the processor of the second management server is configured to control communications between the second transmitting device and the second receiving device based on the allowable interference amount.

According to another exemplary embodiment, the disclosure is directed to method of controlling communications in a network including a first management server configured to control communications between a first transmitting device and a first receiving device and a second management server configured to control communications between a second transmitting device and a second receiving device, the method comprising: calculating, at the second management server, a parameter corresponding to a level of improvement of communication quality at the second receiving device; transmitting the calculated parameter from the second management server to the first management server; calculating, by the first management server, an allowable interference amount at the first receiving device based on the parameter; transmitting the calculated allowable interference amount from the first management server to the second management server; and controlling communications between the second transmitting device and the second receiving device based on the allowable interference amount.

Technical Problem

Assume the case where there are a first network composed of a receiving device and a transmitting device and a second network, and the first network suffers interference from the second network. In this case, the receiving quality in the receiving device of the first network can be improved by increasing the transmission power of the transmitting device of the first network, for example.

However, with the increase in the transmission power of the transmitting device of the first network, the amount of interference from the first network to the second network increases accordingly. Therefore, it has been difficult to increase the total capacity of the entire network merely by unilaterally increasing the transmission power in one local network.

In light of the foregoing, it is desirable to provide novel and improved communication control method, communication system, and management server capable of increasing the total capacity of the entire network by controlling a transmission parameter of each transmitting device of different networks in cooperation between the networks.

BRIEF DESCRIPTION OF DRAWINGS

FIG. 1 is an explanatory view showing an exemplary architecture of a heterogeneous network;

FIG. 2 is an explanatory view showing an overview of each small-to-medium-sized base station;

FIG. 3 is an explanatory view showing an exemplary configuration of a communication system according to an embodiment of the present invention;

FIG. 4 is a functional block diagram showing a configuration of a management server;

FIG. 5 is a sequence chart showing an overall operation in a communication system;

FIG. 6 is an explanatory view showing a relationship between a receiving quality improvement level Mreq desired for a second reviving device 20 and an allowable interference amount in a first receiving device 20A;

FIG. 7 is an explanatory view showing a relationship between an allowable interference amount M' and an average communication capacity in the case of obtaining the allowable interference amount M' by transmission power control; and FIG. 8 is an explanatory view showing a relationship between an allowable interference amount M' and an average communication capacity in the case of obtaining the allowable interference amount M' by transmission rate control.

DESCRIPTION OF EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, each of a plurality of structural elements having substantially the same function is distinguished by affixing a different alphabetical letter to the same reference numeral in some cases. For example, a plurality of structural elements having substantially the same function are distinguished like user equipments 20A, 20B and 20C where necessary. However, when there is no particular need to distinguish between a plurality of structural elements having substantially the same function, they are denoted by the same reference numeral. For example, when there is no particular need to distinguish between the user equipments 20A, 20B and 20C, they are referred to simply as the user equipment 20.

A preferred embodiment of the present invention will be described hereinafter in the following order.

1. Exemplary Architecture of Heterogeneous Network
2. Overview of Embodiment of Present Invention
3. Detailed Description of Operation by Embodiment of Present Invention
3-1. Determination of Necessity of Receiving Quality Improvement (Step 1)
3-2. Calculation of Receiving Quality Improvement Level Expected Value Mreq (Step 2)
3-3. Calculation of Allowable interference amount M (Step 3)
3-4. Control of Transmission Power Based on Allowable interference amount M (Step 4)

4. Advantageous Effects of Embodiment of Present Invention Indicated by Numerical Analysis Results
5. Supplementary Description
6. Summary <1. Exemplary Architecture of Heterogeneous Network>

An embodiment of the present invention is applicable to communication systems in which a plurality of local networks using the same frequency coexist, for example. An example of such communication systems is a heterogeneous network.

A heterogeneous network is a network in which a plurality of kinds of small-to-medium-sized base stations coexist in a macro cell by performing underlay transmission or spectrum sharing. The small-to-medium-sized base stations may be a RRH (Remote RadioHead) cell base station, a hotzone base station (Pico/micro cell eNB), a femtocell base station (Home eNB), a relay node (relay base station) and the like. Note that the underlay transmission is a transmission mode in which a transmitter and a receiver existing in the range that interferes with each other's communication link perform communication using the same frequency channel. It is necessary for the transmitter on the side of making secondary usage of the frequency by the underlay transmission to adjust the interfering level so that it does not act as critical interference for the communication link of the one making the primary usage. The architecture of the heterogeneous network is specifically described below.

FIG. 1 is an explanatory view showing an exemplary architecture of a heterogeneous network. Referring to FIG. 1, the heterogeneous network includes a macro cell base station 10 (which is synonymous with a base station 10), a relay node 30, a hotzone base station 31, a femtocell base station 32, an RRH cell base station 33 and management servers 16A and 16B.

The management server 16A receives management information indicating the state of a cell formed by the macro cell base station 10 from the macro cell base station 10 and controls communication in the cell formed by the macro cell base station 10 based on the management information. Likewise, the management server 16B receives management information indicating the state of a cell formed by the femtocell base station 32 from the femtocell base station 32 and controls communication in the cell formed by the femtocell base station 32 based on the management information. Further, the management servers 16A and 16B have functions for the macro cell base station 10 and the small-to-medium-sized base stations to operate in cooperation with each other. Note that the functions of the management server 16 may be incorporated into the macro cell base station 10 or any one of the small-to-medium-sized base stations.

The macro cell base station 10 manages scheduling information of the small-to-medium-sized base station 30 and the user equipment 20 located inside the macro cell and can communicate with the small-to-medium-sized base station 30 and the user equipment 20 according to the scheduling information.

The hotzone base station 31 (a pico cell base station, a micro cell base station) has the smaller maximum transmission power than the macro cell base station 10 and communicates with the macro cell base station 10 with use of an interface such as X2 or S1 of a core network. Note that the hotzone base station 31 creates OSG (Open Subscriber Group) which is accessible from any user equipment 20.

The femtocell base station 32 has the smaller maximum transmission power than the macro cell base station 10 and communicates with the macro cell base station 10 with use of a packet exchange network such as ADSL. Alternatively, the femtocell base station 32 may communicate with the macro cell base station 10 by a radio link Note that the femtocell base station 32 creates CSG (Closed Subscriber Group) which is accessible only from the limited user equipments 20.

The RRH cell base station 33 is connected with the macro cell base station 10 by an optical fiber. Thus, the macro cell base station 10 transmits signals to the RRH cell base stations 33A and 33B installed in geographically different places through the optical fiber and allows the RRH cell base stations 33A and 33B to transmit signals by radio. For example, only the RRH cell base stations 33 close to the position of the user equipment 20 may be used. Note that functions related to a control system are incorporated into the macro cell base station 10, and optimum transmission mode is selected according to the distribution of the user equipments 20. [0031]

FIG. 2 shows the overview of the respective small-to-medium-sized base stations described above. The small-to-medium-sized base stations such as the hotzone base station 31 and the femtocell base station 32 can increase the total capacity by making secondary usage of the frequency used by the macro cell base station 10.

If the transmission power of the femtocell base station 32 increases, the receiving quality in the user equipment 20D can be improved. However, with the increase in the transmission power of the femtocell base station 32, the amount of interference from the femtocell base station 32 to other communication in the macro cell increases accordingly. Therefore, it has been difficult to increase the total capacity of the entire macro cell merely by unilaterally increasing the transmission power of the femtocell base station 32.

Given such circumstances, an embodiment of the present invention has been invented. According to the embodiment of the present invention, it is possible to increase the total capacity of the entire network by controlling a transmission parameter of each transmitting device (e.g. the macro cell base station 10 and the femtocell base station 32) of different networks in cooperation between the networks. Such an embodiment of the present invention is described hereinafter in detail.

<2. Overview of Embodiment of Present Invention>

Firstly, a configuration of a communication system 1 according to the embodiment of the present invention which is applicable to the above-described heterogeneous network, for example, is described with reference to FIG. 3.

FIG. 3 is an explanatory view showing an exemplary configuration of the communication system 1 according to the embodiment of the present invention. Referring to FIG. 3, the communication system 1 according to the embodiment of the present invention includes a management server 16A (first management server), a management server 16B (second management server), a receiving device 20A (first receiving device), a receiving device 20B (second receiving device), a transmitting device 40A (first transmitting device), and a transmitting device 40B (second transmitting device). Note that the receiving device 20A and the receiving device 20B correspond to each receiving device 20 shown in FIG. 1, the transmitting device 40A corresponds to the macro cell base station 10 shown in FIG. 1, for example, and the transmitting device 40B corresponds to the femtocell base station 32 shown in FIG. 1, for example.

The management server 16A controls communication by the transmitting device 40A and the receiving device 20A, and the management server 16B controls communication by the transmitting device 40B, which makes secondary usage of the same frequency as the transmitting device 40A, and the receiving device 20B.

In the communication system 1, as shown in FIG. 3, a radio signal transmitted from the transmitting device 40A acts as an interference wave in the receiving device 20B, and a radio signal transmitted from the transmitting device 40B acts as an interference wave in the receiving device 20A. Therefore, it is important to appropriately control transmission parameters by the transmitting devices 40A and 40B for optimization of SINR in the receiving devices 20A and 20B. Hereinafter, after the overall operation in the communication system 1 is schematically described with reference to FIGS. 4 and 5, each operation is described in detail in "3. Detailed Description of Operation by Embodiment of Present Invention".

FIG. 4 is a functional block diagram showing a configuration of the management servers 16A and 16B. Referring to FIG. 4, the management server 16A includes a network communication unit 110, an allowable interference amount calculation unit 120, a transmission parameter setting unit 130, and a communication control unit 140. Further, the management server 16B includes a network communication unit 210, an expected value calculation unit 220 (improvement level calculation unit), a transmission power setting unit 230, and a communication control unit 240. The network communication unit 110 of the management server 16A is an interface for communication with the management server 16B and the transmitting device 40A, and the network communication unit 210 of the management server 16B is an interface for communication with the management server 16A and the transmitting device 40B. The other components are described in conjunction with the overall operation in the communication system 1, which is described below with reference to FIGS. 4 and 5.

FIG. 5 is a sequence chart showing the overall operation in the communication system 1. Referring to FIG. 5, the overall operation in the communication system 1 includes the following step 1 to step 4.

Step 1:

The expected value calculation unit 220 of the management server 16B determines whether it is necessary to improve the receiving quality of the receiving device 20B. If it is necessary to improve the receiving quality of the receiving device 20B, the operation after the step 2 is performed.

Step 2:

The expected value calculation unit 220 of the management server 16B calculates an improvement level Mreq of the receiving quality desired for the receiving device 20B. Then, the calculated Mreq is notified to the management server 16A. Note that the processing may be performed by a co-operation manager for the management servers 16A and 16B to operate in cooperation with each other. The same applies to the processing after the step 3.

Step 3:

The allowable interference amount calculation unit 120 of the management server 16A calculates an ideal allowable interference amount M' in the receiving device 20A which is necessary for achieving Mreq, and determines an allowable interference amount M (or an increment M of an allowable interference amount) to be actually applied from the allowable interference amount M'. Then, the transmission parameter setting unit 130 sets a transmission parameter (a transmission power or a transmission rate) of the transmitting device 40A in such a way that the allowable interference amount M is obtained in the receiving device 20A. Further, the allowable interference amount M in the receiving device 20A is notified to the management server 16B.

Step 4:

The transmission power setting unit 230 of the management server 16B sets the transmission power of the transmitting device 40B according to the allowable interference amount M determined by the management server 16A.

It should be noted that the entity of performing each of the above-described steps is not particularly limited. For example, the entity of performing each of the above steps may involve the transmitting device 40A, the transmitting device 40B or the like, and may not involve the management server 16A or the management server 16B. In more detail, the transmitting device 40B may perform the first step, the second step and the four step, and the transmitting device 40A may perform the third step. Further, any one of the management server 16A, the management server 16B, the transmitting device 40A and the transmitting device 40B may perform all of the above steps.

<3. Detailed Description of Operation by Embodiment of Present Invention>

Each of the step 1 to the step 4 described above is described in detail hereinbelow.

(3-1. Determination of Necessity of Receiving Quality Improvement (Step 1))

The expected value calculation unit 220 of the management server 16B determines that it is necessary to improve the receiving quality of the receiving device 20B in the following cases, for example.

Case A:

Case where an actual receiving quality SINR (SINR_secondary) of the receiving device 20B is lower than a required SINR (SINR_required,secondary) required for the receiving device 20B. Specifically, case where the following expression 1 is satisfied.

$$SINR_{secondary} < SINR_{required,secondary} \quad \text{Expression (1)}$$

Case B:

Case where a plurality of receiving devices 20B exist under management of the management server 16B, and the receiving quality SINR (SINR_secondary) of each of the receiving devices 20B is lower than the required SINR (SINR_required,secondary) required for each receiving device 20B. Specifically, case where the following expression 2 is satisfied. Note that the suffix i in the expression 2 indicates a communication link of the i-th receiving device 20B managed by the management server 16B.

$$SINR_{secondary,(i)} < SINR_{required,secondary,(i)} \quad \text{Expression (2)}$$

Case C:

Case where an average SINR of a certain level or higher is necessary (for example, communication of a particular application such as video transmission in need of QoS guarantee is expected) in a given communication range, and a capacity (C_secondary) of a network managed by the management server 16B is insufficient, and improvement (M times) of the capacity is expected as represented in the following expression 3.

$$C_{secondary} \rightarrow M \cdot C_{required,secondary} \quad \text{Expression (3)}$$

(3-2. Calculation of Receiving Quality Improvement Level Expected Value Mreq (Step 2))

The expected value calculation unit 220 of the management server 16B calculates the improvement level Mreq of the receiving quality desired for the receiving device 20B by the following method, for example. Then, the network communication unit 210 of the management server 16B notifies the Mreq calculated by the expected value calculation unit 220 to the management server 16A.

Case A: The expected value calculation unit 220 calculates the ratio of SINR_secondary and SINR_required,secondary as Mreq as represented in the following expression 4.

$$M_{req} = SINR_{required,secondary} / SINR_{secondary} \qquad \text{Expression (4)}$$

Case B: The expected value calculation unit 220 calculates the receiving quality improvement level Mreq for each communication link as represented in the following expression 5.

$$M_{req,(i)} = SINR_{required,secondary,(i)} / SINR_{secondary,(i)} \qquad \text{Expression (5)}$$

Case C: Because the relationship between the capacity C and SINR is generally represented as the following expression 6, the required SINR_required,secondary can be calculated according to the expression 7. The expected value calculation unit 220 can calculate Mreq according to the expression 4 or 5 by using the required SINR_required,secondary.

$$C = \log_2(1 + SINR) \qquad \text{Expression (6)}$$

$$SINR = 2^C - 1 \qquad \text{Expression (7)}$$

(3-3. Calculation of Allowable Interference Amount M (Step 3))

The allowable interference amount calculation unit 120 of the management server 16A first calculates the allowable interference amount M' in the receiving device 20A by the following method so as to achieve the Mreq notified from the management server 16B.

Case A: When a Calculation Target of the Allowable Interference Amount is a Single Link
Method A-1: Calculation of the Allowable Interference Amount M' by Transmission Power Control
In the case of obtaining the allowable interference amount corresponding to Mreq by increasing the transmission power of the transmitting device 40A, the allowable interference amount calculation unit 120 of the management server 16A calculates the allowable interference amount M' according to the following expression 8, for example. Note that a method of deriving the expression 8 is described later in "5. Supplementary Description".

$$M' = \frac{SINR_{primary}(P_{rx,secondary}N'_{primary} + M_{req}SINR_{secondary}I_{secondary \to primary}N'_{secondary})}{P_{rx,primary}P_{rx,secondary} - M_{req}SINR_{primary}SINR_{secondary}I_{secondary \to primary}I_{primary \to secondary}}, \qquad \text{Expression (8)}$$

where
- $P_{rx,primary}$: Receiving power of the receiving device 20A (before start of power control according to the embodiment),
- $P_{rx,secondary}$: Receiving power of the receiving device 20B (before start of power control according to the embodiment),
- $I_{primary \to secondary}$: Interference from the transmitting device 40A to the receiving device 20B,
- $I_{secondary \to primary}$: Interference from the transmitting device 40B to the receiving device 20A,
- $N'_{primary}$: (Interference+noise) power of the receiving device 20A, and
- $N'_{secondary}$: (Interference+noise) power of the receiving device 20B.

Note that the parameters in the expression 8 can be acquired through sensing by the receiving device 20A, the receiving device 20B, the transmitting device 40A and the transmitting device 40B, and transmitted and received via the management server 16A or the management server 16B.

Method A-2: Calculation of the Allowable Interference Amount M' by Transmission Rate Control
In the case of obtaining the allowable interference amount corresponding to Mreq by decreasing the transmission rate of the transmitting device 40A, the allowable interference amount calculation unit 120 of the management server 16A calculates the allowable interference amount M' according to the following expression 9, for example. Note that a method of deriving the expression 9 is described later in "5. Supplementary Description".

$$M' = \frac{SINR_{primary}\{P_{rx,secondary}N'_{primary} + M_{req}SINR_{secondary}I_{secondary \to primary}(I_{primary \to secondary} + N'_{secondary})\}}{P_{rx,primary}P_{rx,secondary}} \qquad \text{Expression (9)}$$

Case B: When a Calculation Target of the Allowable Interference Amount is a Multilink
Method B-1: Calculation of the Allowable Interference Amount M' by Transmission Power Control
In the case of obtaining the allowable interference amount by increasing the transmission power of the transmitting device 40A, the allowable interference amount calculation unit 120 of the management server 16A calculates the total allowable interference amount M' for communication links of a plurality of receiving devices 20A according to the following expression 10, for example.

$$M' = \sum_{i=1}^{N_B} \frac{SINR_{primary}(P_{rx,secondary,(i)}N'_{primary} + M_{req}SINR_{secondary,(i)}I_{secondary,(i) \to primary}N'_{secondary,(i)})}{P_{rx,primary}P_{rx,secondary,(i)} - M_{req}SINR_{primary}SINR_{secondary,(i)}I_{secondary,(i) \to primary}I_{primary \to secondary,(i)}} \qquad \text{Expression (10)}$$

Method B-2: Calculation of the Allowable Interference Amount M' by Transmission Rate Control
In the case of obtaining the allowable interference amount by decreasing the transmission rate of the transmitting device 40A, the allowable interference amount calculation unit 120 of the management server 16A calculates the total allowable interference amount M' for communication links of a plurality of receiving devices 20A according to the following expression 11, for example.

$$M' = \sum_{i=1}^{N_B} \frac{SINR_{primary}\{P_{rx,secondary,(i)}N'_{primary} + M_{req}SINR_{secondary,(i)}I_{secondary,(i) \to primary}(I_{primary \to secondary,(i)} + N'_{secondary,(i)})\}}{P_{rx,primary}P_{rx,secondary,(i)}} \qquad \text{Expression (11)}$$

After the allowable interference amount calculation unit 120 of the management server 16A calculates the ideal allowable interference amount M' in the receiving device 20A for achieving Mreq by the above method, it determines an allowable interference amount M to be actually applied, with the ideal allowable interference amount M' as an upper limit. This is because the case where it is difficult to obtain the ideal allowable interference amount M' is assumed according to circumstances.

For example, when the transmitting device 40A already transmits a radio signal with the maximum transmission power or with a power close to the maximum transmission power, it is unable to sufficiently increase the transmission power and obtain the ideal allowable interference amount M'. An alternative case is when certain QoS guarantee is expected for the communication link of the receiving device 20A, and the lower limit of a rate or latency is restricted.

In such cases, the allowable interference amount calculation unit 120 of the management server 16A determines the allowable interference amount M to be actually applied in a best effort manner, with the ideal allowable interference amount M' as the upper limit. Note that the allowable interference amount calculation unit 120 may determine the allowable interference amount M which is closer to the ideal allowable interference amount M' by combining the increase in transmission power and the decrease in transmission rate. For example, when the allowable interference amount obtained by the increase in transmission power is M1, and the allowable interference amount obtained by the decrease in transmission rate is M2, the allowable interference amount M=M1*M2 can be obtained by combining the increase in transmission power and the decrease in transmission rate.

Then, the transmission parameter setting unit 130 of the management server 16A changes the transmission parameter of the transmitting device 40A in order to obtain the allowable interference amount M determined by the allowable interference amount calculation unit 120. For example, the transmission parameter setting unit 130 may change the transmission power of the transmitting device 40A to M times. Alternatively, the transmission parameter setting unit 130 may change the transmission rate of the transmitting device 40A so that the current transmission power of the transmitting device 40A becomes M times the transmission power necessary to satisfy the required SINR of the transmission rate after change. Further, the transmission parameter setting unit 130 may increase the transmission power and decrease the transmission rate so that the product of multiplying the allowable interference amount M1 obtained by the increase in transmission power by the allowable interference amount M2 obtained by the decrease in transmission rate becomes M.

Further, the network communication unit 110 of the management server 16A notifies the allowable interference amount M determined by the allowable interference amount calculation unit 120 to the management server 16B.

(3-4. Control of Transmission Power Based on Allowable Interference Amount M (Step 4))

The transmission power setting unit 230 of the management server 16B increases the transmission power of the transmitting device 40B within the range that the amount of interference from the transmitting device 40B to the transmitting device 40A is the allowable interference amount M or less, based on the allowable interference amount M notified from the management server 16A.

(Setting of Transmission Power for Single Link)

Specifically, the transmission power setting unit 230 calculates a transmission power P'tx,secondary after update of the transmitting device 40B as follows.

$$P'_{tx,secondary} = M'_{req} P_{tx,secondary} \quad \text{Expression (12)}$$
$$= \frac{(P_{rx,primary} M - SINR_{primary} N'_{primary}) P_{tx,secondary}}{SINR_{primary} I_{secondary \to primary}},$$

where $$M'_{req} = \frac{P_{rx,primary} M - SINR_{primary} N'_{primary}}{SINR_{primary} I_{secondary \to primary}}$$

(Setting of Transmission Power for Multilink)

Further, when the allowable interference amount M is given, the transmission power setting unit 230 can calculate the transmission power of each communication link evenly as represented in the following expression 13.

$$P'_{tx,secondary,(i)} = \quad \text{Expression (13)}$$
$$\frac{(P_{rx,primary} M - SINR_{primary} N'_{primary}) P_{tx,secondary}}{SINR_{primary} I_{secondary \to primary}} \cdot \frac{1}{N_B}$$

Alternatively, the transmission power setting unit 230 may calculate the transmission power of each communication link by assigning weights according to the required allowable interference amount (Mreq(i)) of each communication link as represented in the following expression 14.

$$P'_{tx,secondary,(i)} = \quad \text{Expression (14)}$$
$$\frac{(P_{rx,primary} M - SINR_{primary} N'_{primary}) P_{tx,secondary}}{SINR_{primary} I_{secondary \to primary}} \cdot \frac{M_{req,(i)}}{\sum_{j=0}^{N_B} M_{req,(j)}}$$

<4. Advantageous Effects of Embodiment of Present Invention Indicated by Numerical Analysis Results>

Since numerical analysis of the increasing amount of the average communication capacity between the transmitting device 40A and the receiving device 20A and between the transmitting device 40B and the receiving device 20B which is obtained by the embodiment of the present invention is performed, results of the numerical analysis are described hereinbelow. In the numerical analysis, it is assumed that the distance between the transmitting device 40A and the transmitting device 40B is 300 m, the receiving devices 20A and 20B are located within the range of 50 m from the transmitting device 40B, and M=M'.

FIG. 6 is an explanatory view showing a relationship between the receiving quality improvement level Mreq desired for the second reviving device 20B and the allowable interference amount M' in the receiving device 20A. Referring to FIG. 6, it is verified that M' increases exponentially with respect to Mreq with use of any of transmission power control (TPC) and transmission rate control (RC). Particularly, because M' increases abruptly when Mreq is 40 dB or higher, it is considered that the control of M' in this region is effective.

Further, it is found that the increasing amount of M' with respect to the same Mreq is greater when performing the transmission power control than when performing the transmission rate control. This is because, when performing the transmission power control, both of the amount of interference from the transmitting device 40A to the receiving device 20B and the amount of interference from the transmitting device 40B to the receiving device 20A increase, and it is thus necessary to further increase the transmission power of the transmitting device 40A. In actual operation, there is the upper limit of the transmission power of each transmitting device 40, and the management server 16A controls the value of M within the range not exceeding the upper limit.

FIG. 7 is an explanatory view showing a relationship between the allowable interference amount M' and the average communication capacity in the case of obtaining the allowable interference amount M' by transmission power control. Referring to FIG. 7, in the case of obtaining the allowable interference amount M' by transmission power control, the communication capacity (TPC, PS) between the transmitting device 40A and the receiving device 20A is controlled to be constant with respect to M'. Therefore, it is shown that the increment of the communication capacity (TPC, SS) between the transmitting device 40B and the receiving device 20B serves as the increment of the total communication capacity.

Further, referring to FIG. 7, the communication capacity between the transmitting device 40B and the receiving device 20B tends to be saturated when M' reaches approximately 5 dB. Specifically, it is considered that an unlimited increase in M' does not contribute to the increase in the total communication capacity. Thus, the allowable interference amount calculation unit 120 of the management server 16A may determine the value of the allowable interference amount M within the range that does not exceed a predetermined upper limit (e.g. 5 dB).

FIG. 8 is an explanatory view showing a relationship between the allowable interference amount M' and the average communication capacity in the case of obtaining the allowable interference amount M' by transmission rate control. Referring to FIG. 8, in the case of obtaining the allowable interference amount M' by transmission rate control, the transmission power of the transmitting device 40A is kept constant, and therefore the communication capacity between the transmitting device 40A and the receiving device 20A tends to decrease with an increase in M'. However, because the increment of the communication capacity between the transmitting device 40B and the receiving device 20B is greater than the decrement of the communication capacity between the transmitting device 40A and the receiving device 20A, the total communication capacity increases.

Further, just like the case of transmission power control, the communication capacity between the transmitting device 40B and the receiving device 20B tends to be saturated when M' reaches approximately 5 dB. Specifically, it is considered that an unlimited increase in M' does not contribute to the increase in the total communication capacity. Thus, the allowable interference amount calculation unit 120 of the management server 16A may determine the value of the allowable interference amount M within the range that does not exceed a predetermined upper limit (e.g. 5 dB) in the case of obtaining the allowable interference amount by transmission rate control as well.

<5. Supplementary Description>

Hereinafter, processes of deriving the expression 8 and the expression 9 for calculating the allowable interference amount M' on the basis of Mreq are described.

Derivation of Expression 8

One example of a method of calculating an allowable interference amount M' of the receiving device 20A and an actual transmission power increasing amount M'req of the transmitting device 40B from Mreq required by the management server 16B is to solve the system of linear equations with two unknowns by SINR condition of the receiving device 20A and SINR condition of the receiving device 20B.

First, as the SINR condition of the receiving device 20A, the following expression 15 can be used.

$$SINR_{primary} = \frac{M'P_{rx,primary}}{M'_{req}I_{secondary \to primary} + N'_{primary}} \quad \text{Expression (15)}$$

Further, as the SINR condition of the receiving device 20B, the following expression 16 can be used.

$$SINR_{secondary,req} = \quad \text{Expression (16)}$$

$$M_{req}SINR_{secondary} = \frac{M'_{req}P_{rx,secondary}}{M'I_{primary \to secondary} + N'_{secondary}}$$

Summarizing the expression 15 and the expression 16 yields the simultaneous equations with respect to M' and M'req.

$$\begin{cases} P_{rx,primary}M' - SINR_{primary}I_{secondary \to primary} \\ \quad M'_{req} = SINR_{primary}N'_{primary} \\ SINR_{secondary}M_{req}I_{primary \to secondary}M' - \\ \quad P_{rx,secondary}M'_{req} = -SINR_{secondary}M_{req}N'_{secondary} \end{cases} \quad \text{Expression (17)}$$

Solving the above expression 17 with respect to M' yields the expression 8, and solving the expression 17 with respect to M'req after M is determined in the above-described step 3 yields the expression 12.

Note that the parameters in the expressions 15 to 17, the expression 8 and the expression 12 can be also represented as follows.

$$P_{rx,primary} = L_{primary \to primary}P_{tx,primary} \quad \text{Expression (18)}$$

$$P_{rx,secondary} = L_{secondary \to secondary}P_{tx,secondary}$$

$$I_{primary \to secondary} = L_{primary \to secondary}P_{tx,primary}$$

$$I_{secondary \to primary} = L_{secondary \to primary}P_{tx,secondary}$$

$$SINR_{primary} = \frac{P_{rx,primary}}{I_{secondary \to primary} + N'_{primary}}$$

$$SINR_{secondary} = \frac{P_{rx,secondary}}{I_{primary \to secondary} + N'_{secondary}},$$

where $L_{primary \to primary}$: Path loss of a communication link between the transmitting device 40A and the receiving device 20A, $L_{secondary \to secondary}$: Path loss of a communication link between the transmitting device 40B and the receiving device 20B, $L_{primary \to secondary}$: Path loss of an interference link between the transmitting device 40A and the receiving device 20B, $L_{secondary \to primary}$: Path loss of an interference link between the transmitting device 40B and the receiving device 20A, $P_{tx,secondary}$: Transmission power before change of the transmitting device 40A, and $P_{tx,secondary}$: Transmission power before change of the transmitting device 40B.

By substituting the respective parameters represented in the above expression 18 into the expression 8 and the expression 12, M' can be represented by the following expression 19, and M'req can be represented by the following expression 20.

$$M' = \qquad \text{Expression (19)}$$

$$\frac{N'_{primary} + \frac{M_{req} L_{secondary \to primary} P_{tx,secondary} N'_{secondary}}{(L_{secondary \to primary} P_{tx,secondary} + N'_{primary})}}{(L_{primary \to secondary} P_{tx,primary} + N'_{secondary}) - \frac{M_{req} P_{tx,primary} P_{tx,secondary} L_{secondary \to primary}}{L_{primary \to secondary}}}$$

$$M'_{req} = \frac{M(L_{secondary \to primary} P_{tx,secondary} + N'_{primary}) - N'_{primary}}{L_{secondary \to primary} P_{tx,secondary}} \quad \text{Expression (20)}$$

Derivation of Expression 9

In the case of obtaining the allowable interference amount M' of the receiving device 20A and the actual transmission power increasing amount M'req of the transmitting device 40B by controlling the transmission rate also, M' and M'req can be obtained by solving the system of linear equations with two unknowns by SINR condition of the receiving device 20A and SINR condition of the receiving device 20B.

First, as the SINR condition of the receiving device 20A, the following expression 21 can be used.

$$SINR_{primary,req} = \qquad \text{Expression (21)}$$

$$\frac{1}{M'} SINR_{primary} = \frac{P_{rx,primary}}{M'_{req} I_{secondary \to primary} + N'_{primary}}$$

Further, as the SINR condition of the receiving device 20B, the following expression 22 can be used.

$$SINR_{secodnary,req} = \qquad \text{Expression (22)}$$

$$M_{req} SINR_{secondary} = \frac{M'_{req} P_{rx,secondary}}{I_{primary \to secondary} + N'_{secondary}}$$

Summarizing the expression 21 and the expression 22 yields the following system of linear equations with two unknowns shown below.

$$\begin{cases} P_{rx,primary} M' - SINR_{primary} I_{secondary \to primary} \\ M'_{req} = SINR_{primary} N'_{primary} \\ P_{rx,secondary} M'_{req} = \\ M_{req} SINR_{secondary} (I_{primary \to secondary} + N'_{secondary}) \end{cases} \quad \text{Expression (23)}$$

Solving the above expression 23 with respect to M' yields the expression 9, and solving the expression 23 with respect to M'req after M is determined in the above-described step 3 yields the expression 12.

Further, by substituting the respective parameters represented in the above expression 18 into the expression 9 and the expression 12, M' can be represented by the following expression 24, and M'req can be represented by the following expression 25.

$$M' = \frac{M_{req} L_{secondary \to primary} P_{tx,secondary} + N'_{primary}}{L_{secondary \to primary} P_{tx,secondary} + N'_{primary}} \quad \text{Expression (24)}$$

$$M'_{req} = \frac{M(L_{secondary \to primary} P_{tx,secondary} + N'_{primary}) - N'_{primary}}{L_{secondary \to primary} P_{tx,secondary}} \quad \text{Expression (25)}$$

<6. Summary>

As described above, according to the embodiment of the present invention, the allowable interference amount M in the receiving device 20A is obtained by increasing the transmission power of the transmitting device 40A or decreasing the transmission rate of the transmitting device 40A. Then, the transmitting device 40B sets the transmission power in the range that interference on the receiving device 20A does not exceed the allowable interference amount M. In such a configuration, as described above with reference to FIGS. 7 and 8, it is possible to effectively increase the communication capacity of the entire network.

Although a preferred embodiment of the present invention is described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

Further, it is possible to create a computer program that causes hardware such as a CPU, ROM and RAM incorporated in the management server 16 to function equally to the respective elements of the management server 16 described above. Further, a memory medium that stores such a computer program may be provided.

It should be noted that the term "secondary usage" in this specification typically means utilization of an additional or alternative communication service (a second communication service) using a part or whole of a spectrum assigned to a first communication service. In this context about the meaning of the term "secondary usage", the first communication service and the second communication service may be services of different types or the same type. The services of different types may be selected from services such as digital TV broadcasting service, satellite communication service, mobile communication service, wireless LAN access service, P2P (Peer To Peer) connection service and the like.

On the other hand, services of the same type may contain, for example, a relationship between a service using the macro cell provided by a communication carrier and a service using the femtocell operated by users or MVNO (Mobile Virtual Network Operator) in a mobile communication service. Additionally, services of the same type may contain, for example, a relationship between a service provided by a macro cell base station and a service provided by a relay station (relay node) to cover a spectrum hole in a communication service conforming to LTE-A (Long Term Evolution-Advanced).

The disclosed concept is applicable in various different types of communication systems. For example, in LTE-A, a control area (PDCCH: Physical Downlink Control Channel) and data area (PDSCH: Physical Downlink Shared Channel) are separately assigned in a communication area. In this configuration, there are generally two ways to solve the problem of interference between different types of communication nodes.

A first solution is to reduce interference in both of the control area (PDCCH) and the data area (PDSCH). This is a basic way to reduce interference occurring between different types of communication nodes.

A second solution is to reduce interference only in the control area (PDCCH). This solution is based on the fact that the scheduler in the node assigns data resources for a particular data area. Here, the scheduler, which is normally implemented in a MAC function of a base station, is the component that assigns the data resources. In other words, with regard to the resource that interference between different types of nodes is estimated to occur, interference can be avoided by assigning resources only to one of the nodes. This can be realized by collaboration of schedulers running on the different types of nodes. On the other hand, with regard to the control area (PDCCH), since the scheduler can not change the resource allocation, it is important to reduce interference in the control area from the beginning.

The configuration disclosed herein can be applied to both of he control area and the data area as well as only to the control area.

Further, the second communication service may be a service utilizing a plurality of fragmentary frequency bands aggregated using spectrum aggregation technology. Furthermore, the second communication service may be a supplementary communication service provided by femtocells, relay stations or small-to-medium-sized base stations providing smaller service areas than a macro cell base station, which are located within the service area provided by the macro cell base station. The subject matter of each embodiment of the present invention described in this specification is widely applicable to every type of mode of such secondary usages.

REFERENCE SIGNS LIST 16, 16A, 16B Management server
20, 20A, 20B Receiving device
40, 40A, 40B Transmitting device
110, 210 Network communication unit
120 Allowable interference amount calculation unit
130 Transmission parameter setting unit
140 Communication control unit
220 Expected value calculation unit
230 Transmission power setting unit
240 Communication control unit

The invention claimed is:

1. A first electronic device comprising:
circuitry configured to:
set a first transmission parameter of the first electronic device;
communicate with a second electronic device in a first network; and
communicate with a third electronic device, the third electronic device being configured to communicate with a fourth electronic device in a second network by utilizing a first frequency channel that is allocated to the first network,
wherein the first transmission parameter of the first electronic device is set in consideration of a first communication quality required for the second electronic device, the first communication quality being calculated based on a second communication quality required for the fourth electronic device and an allowable interference amount at the second electronic device, the allowable interference amount based on receiving powers of the second and fourth electronic devices, interferences at the second and fourth electronic devices, and interference plus noise powers at the second and fourth electronic devices,
wherein a second transmission parameter of the third electronic device is set in consideration of the first communication quality, and
wherein the circuitry sets the first transmission parameter of the first electronic device to ensure the allowable interference amount at the second electronic device from the first electronic device and the third electronic device is achieved.

2. The first electronic device of claim 1, wherein the first transmission parameter and the second transmission parameter indicate transmission power.

3. The first electronic device of claim 1, wherein the first electronic device and the third electronic device correspond to base stations and the second electronic device and the fourth electronic device correspond to terminal devices.

4. The first electronic device of claim 3, wherein the first electronic device corresponds to a macro base station and the third electronic device corresponds to a small case station.

5. The first electronic device of claim 1, wherein the third electronic device and the fourth electronic device communicate using a frequency that overlaps with a frequency used for communication between the first electronic device and the second electronic device.

6. The first electronic device of claim 1, wherein the first communication quality is calculated by a management server, the management server being configured to communicate with the first electronic device and the third electronic device.

7. The first electronic device of claim 6, wherein the management server is implemented on at least one of the first electronic device and the third electronic device.

* * * * *